United States Patent [19]

White

[11] Patent Number: 5,187,240

[45] Date of Patent: * Feb. 16, 1993

[54] PROCESS FOR PREPARING N-HALOTHIOSULFONAMIDE-MODIFIED NON-RUBBERY THERMOPLASTIC OLEFINS

[75] Inventor: Donald A. White, Edison, N.J.

[73] Assignee: Exxon Chemical Patents Inc., Linden, N.J.

[*] Notice: The portion of the term of this patent subsequent to Sep. 11, 2007 has been disclaimed.

[21] Appl. No.: 626,280

[22] Filed: Dec. 12, 1990

Related U.S. Application Data

[60] Division of Ser. No. 439,542, Nov. 20, 1989, Pat. No. 5,034,467, which is a continuation-in-part of Ser. No. 244,743, Sep. 15, 1988, Pat. No. 4,956,420.

[51] Int. Cl.$^5$ .............................................. C08C 19/22
[52] U.S. Cl. ..................................... 525/351; 524/398
[58] Field of Search ......................................... 525/351

[56]  References Cited

U.S. PATENT DOCUMENTS

| | | | |
|---|---|---|---|
| 3,915,907 | 10/1975 | Hopper | 525/351 |
| 3,970,133 | 7/1976 | Hopper | 525/351 |
| 4,820,780 | 4/1989 | Hopper | 525/351 |

Primary Examiner—Christopher Henderson
Attorney, Agent, or Firm—M. L. Gibbons; J. E. Schneider

[57] ABSTRACT

N-halothiosulfonamide-modified non-rubbery thermoplastic polyolefins are provided. The modified polyolefin products are prepared by reaction of a non-rubbery thermoplastic polyolefin polymer with an N-halothiosulfonamide in the absence or, preferably, in the presence of a catalyst. The preferred catalyst for use in the preparation of these products are salts of weak acids of specified metals.

20 Claims, 1 Drawing Sheet

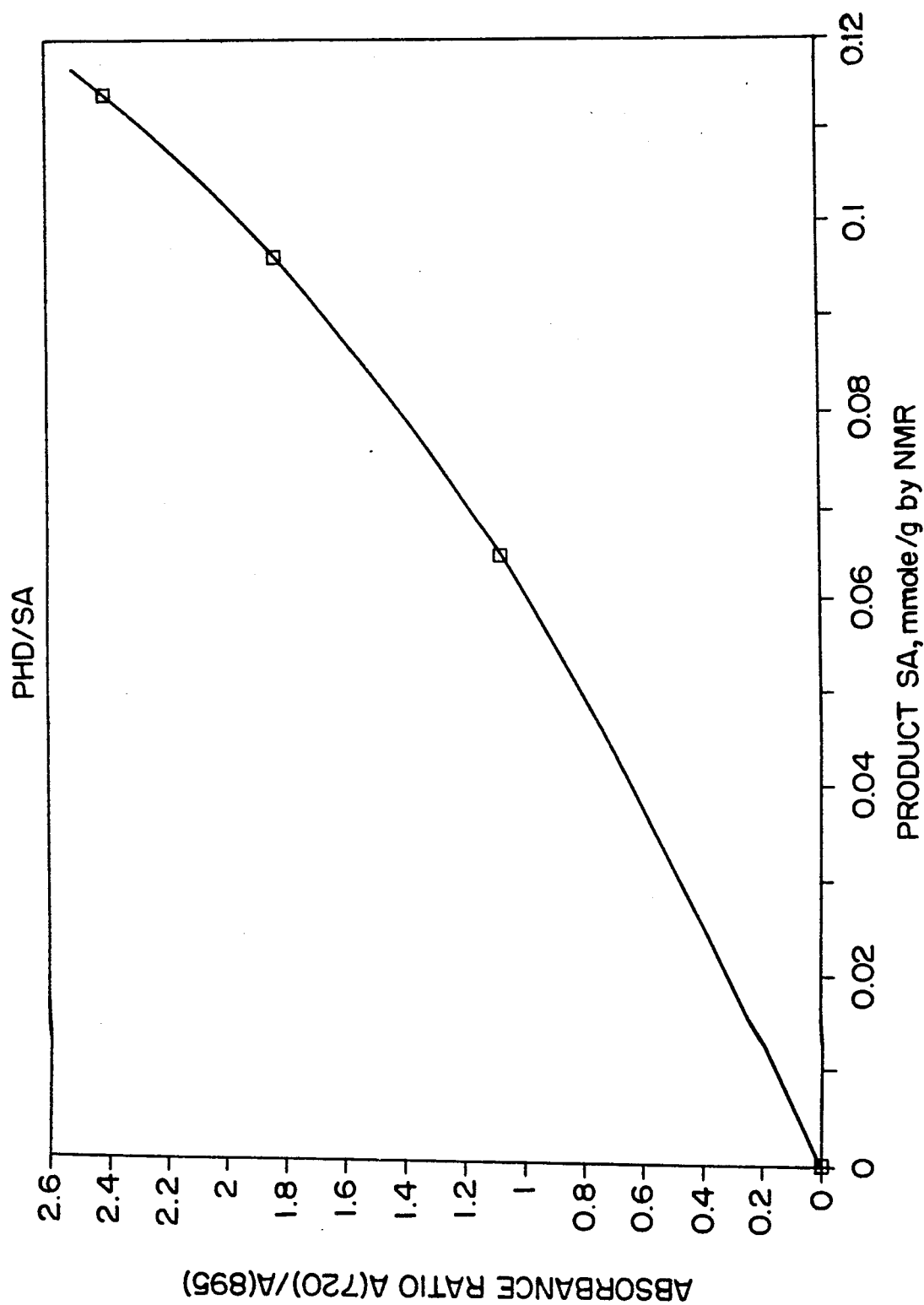

PROCESS FOR PREPARING N-HALOTHIOSULFONAMIDE-MODIFIED NON-RUBBERY THERMOPLASTIC OLEFINS

CROSS-REFERENCE TO RELATED APPLICATIONS

This is a division of application Ser. No. 439,542, filed Nov. 20, 1989 now U.S. Pat. No. 5,034,467 which is a continuation-in-part of U.S. patent application Ser. No. 244,743 filed Sep. 15, 1988, now U.S. Pat. No. 4,956,420 granted Sep. 11, 1990.

BACKGROUND OF THE INVENTION

1. Field of the Invention

The present invention relates to N-halothio-sulfonamide-modified non-rubbery thermoplastic polyolefins and a process for their preparation.

2. Description of Information Disclosures

Non-rubbery thermoplastic polyolefins are well known. The term "thermoplastic", with reference to polyolefins, is used herein to denote materials which can be molded or otherwise shaped and reprocessed at temperatures above their melting or softening point. By the term "non-rubbery" with reference to the polyolefins is intended herein a polyolefin having an initial tensile modulus (i.e., modulus of elasticity) and a crystallinity which do not fall within the ranges of modulus of elasticity and crystallinity of rubbery polymers. Thus, rubbery polymers generally have an initial tensile modulus ranging from $10^{-3}$ to $10^0$ kg/mm$^2$ and a percentage crystallinity in the range of 0 to 35 weight percent. R. J. Hopper U.S. Pat. No(s). 3,915,907, 3,970,133 and 4,820,780, the teachings of which are hereby incorporated by reference, disclose chlorothiosulfonamide-modified terpolymers of ethylene, a higher alpha olefin and a non-conjugated diene. The desirability and advantages of these modified rubbery terpolymers were also disclosed in articles authored or co-authored by R. J. Hopper (Rubber Chemistry and Technology, vol. 49, pages 341–352, 1976) and International Conference on Advances in Stabilization and Controlled Degradation of Polymers, Lucerne, Switzerland, May, 23–25, 1984.

Improvement of the physical and dynamic properties of thermoplastic polyolefins are still sought and are of practical importance. For example, the introduction of polar functionality into a polyolefin, which is by its nature non-polar, may provide sites for the anchoring of additives and coloring agents to the polymer. Such additives are normally added as non-polymeric molecules, which may diffuse out of or leach out of the polymer. This deficiency is overcome by the anchoring of an additive to a polar site bound to the polymer. When a non-rubbery thermoplastic polyolefin polymer has a high propylene content (e.g., higher than 80 weight percent), the functionality may be useful for crosslinking the polymer for use in electrical coatings. The modified thermoplastic polymer products of the present invention are expected to be particularly useful in the plastics industry.

It has now been found that the reaction of a N-halothiosulfonamide with non-rubbery thermoplastic polyolefins will produce N-halothiosulfonamide-modified thermoplastic polyolefin reaction products having improved properties.

SUMMARY OF THE INVENTION

In accordance with the invention, there is provided a modified polymer product comprising:

(a) a component comprising a non-rubbery thermoplastic polymer of (1) at least one 1-alkene containing from 2 to 16 carbon atoms, and (2) at least one non-conjugated diene containing from 6 to 16 carbon atoms, wherein said diene, following incorporation in said non-rubbery thermoplastic polymer, does not include an olefinic carbon atom which is fully substituted; said non-rubbery thermoplastic polymer having an initial tensile modulus ranging from above about $10^0$ to about $10^3$ kilograms per square millimeter, and having an amount of crystallinity of at least about 35 weight percent; and (b) a N-halothiosulfonamide component of the formula:

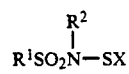

wherein X is chlorine or bromine and wherein $R^1$ and $R^2$ are selected from the group consisting of alkyl groups having from 1 to 20 carbon atoms, aralkyl groups having from 7 to 20 carbon atoms, alkaryl groups having from 7 to 20 carbon atoms, substituted aryl groups having from 6 to 10 carbon atoms, and wherein $R^2$ is also selected from groups having the formula:

wherein $R^3$ and $R^4$ are individually selected from said alkyl, aryl, and substituted aryl groups, and wherein $R^3$ and $R^4$ can be joined together to represent groups selected from the groups consisting of —(CH$_2$)$_n$—, wherein n is an integer ranging from 4 to 7, and —(CH$_2$)$_2$—O—(CH$_2$)$_2$—, said N-halothiosulfonamide component being comprised in said modified polymer product in an amount ranging from about 0.1 to about 10 mole percent based on said modified polymer product.

In accordance with the invention, there is also provided a process for preparing the N-halothiosulfonamide-modified non-rubbery thermoplastic polyolefin products, which comprises reacting a non-rubbery thermoplastic polymer of the above-mentioned type with a sufficient amount of a N-halothiosulfonamide of the above-stated formula under reaction conditions.

BRIEF DESCRIPTION OF THE DRAWING

The FIGURE is a graph in which an infrared absorbance ratio is plotted against the N-halothiosulfonamide content of a propylene/1,4-hexadiene copolymer.

DETAILED DESCRIPTION OF THE INVENTION

The modified non-rubbery thermoplastic polyolefin product of the present invention comprises a thermoplastic polyolefin component and a N-halothiosulfonamide component.

THE NON-RUBBERY THERMOPLASTIC POLYOLEFIN COMPONENT

The non-rubbery thermoplastic polyolefin component is a polymer of at least one 1-alkene (i.e., an alpha olefin) and at least one non-conjugated diene.

The non-rubbery thermoplastic polyolefin, prior to modification with the N-halothiosulfonamide, has an initial tensile modulus ranging from about above $10^0$ to about $10^3$ kilograms per square millimeter (kg/mm$^2$), as measured by ASTM test D-638-80. This is equivalent to $10^2$ to $10^5$ kg/cm$^2$, or about $1.4 \times 10^3$ to $1.4 \times 10^6$ psi, or about $10^4$ to $10^6$ MPa; and a percentage crystallinity of at least about 35 weight percent, preferably from about 35 wt. percent to about 95 wt. percent, as measured by means known in the art. Three major methods of determining crystallinity are based on specific volume, X-ray diffraction, an infrared spectroscopy. Thus, suitable non-rubbery thermoplastic polymers for use in the present invention have initial tensile modulus and crystallinity which are typical of plastic (i.e., non-rubbery polymer properties) as shown in R. W. Lenz in *"Organic Chemistry of High Polymers"*, Interscience Publishers, New York, 1967.

Suitable 1-alkenes for use in the preparation of the non-rubbery thermoplastic polymer are 1-alkenes containing from 2 to 16 carbon atoms. The 1-alkenes may have alkyl substituents but not at the double bond. Examples of suitable 1-alkenes include ethylene, propylene, 1-butene; 3-methyl-1-butene; 4-methyl-1-pentene; 1-hexene; 1-octene, and mixtures thereof. More than one 1-alkene may be used in the preparation of the non-rubbery thermoplastic polymer of the present invention. The preferred 1-alkenes are ethylene, propylene and mixtures thereof.

The 1-alkene may be present in the non-rubbery thermoplastic polymer, prior to modification with the N-halothiosulfonamide (CTSA), in an amount ranging from about 50 to 99.9, preferably from about 70 to 99.9, more preferably from about 90 to 99.9 mole percent, based on the non-rubbery thermoplastic polymer.

The term "CTSA" is used herein to denote any of the N-halothiosulfonamides.

When an optional additional 1-alkene is used in the preparation of the non-rubbery thermoplastic polymer component, the additional (i.e., second) 1-alkene may be present in an amount ranging from about above zero to 49.9, preferably from above zero to 29.9, more preferably from above zero to about 9.9 mole percent, based on the non-rubbery thermoplastic polymer.

Suitable diene (i.e., alkadiene) monomers for use as a component of the non-rubbery thermoplastic polyolefin component of the invention include polymerizable, non-conjugated dienes which can be straight chain, hydrocarbon diolefins or alkenyl-substituted alkenes, having from about 6 to about 16 carbon atoms. For example, the diene may be selected from the group consisting of straight chain acyclic dienes, such as 1,4-hexadiene; 1,5-octadiene; 1,6-decadiene; and 1,6-octadiene and multi ring alicyclic fused and bridged ring dienes such as dicyclopentadiene, as well as certain norbornene compounds which satisfy the requirement described below, e.g., propenyl norbornene and crotyl norbornene, and mixtures thereof. The preferred dienes are 1,4-hexadiene; dicylopentadiene; propenyl-norbornene; crotylnorbornene and mixtures thereof. The most preferred diene is 1,4-hexadiene.

After incorporation in the non-rubbery thermoplastic polyolefin, the residual unsaturation contributed by the diene monomer should not result in an olefinic carbon atom which is fully substituted (a quarternary carbon atom). Therefore, dienes, such as 5-ethylidene-2-norbornene and 5-methylene-2-norbornene are not suitable because one of the residual olefinic carbon atoms in the resulting polymer is fully substituted.

Generally, there may be one or more 1-alkenes in the non-rubbery polyolefin polymer component and, typically, only one of said non-conjugated diene. In special cases, however, there may be present in the non-rubbery thermoplastic polyolefin polymer of the invention more than one of non-conjugated diene. When the diene is available as a mixture of difficultly separable isomers, the mixture of such isomers may be employed in the preparation of the non-rubbery thermoplastic polyolefin polymer of the present invention.

The non-conjugated diene may be present in the non-rubbery thermoplastic polyolefin in an amount ranging from about 20 to 0.1, preferably from 15 to 1, most preferably from 10 to 0.1 mole percent. When more than one diene is present, the total amount of dienes will suitably have the above-stated ranges.

For any composition of 1-alkene, diene, and optional additional alkene and optional additional diene, non-rubbery properties may result if the arrangement of these components in the thermoplastic polyolefin component is highly ordered. This can be illustrated by the example of the well known ethylene/propylene copolymers. A 50 mole percent ethylene diblock copolymer will be non-rubbery, while a 50 mole percent ethylene random copolymer is rubbery. The crystallinity and other non-rubbery properties of the block copolymer result from the long sequences of the individual monomers. The orderliness need not be perfect and non-rubbery properties can result from compositions that are intermediate between perfect diblocks and random copolymers. For example, when a random copolymer or a random terpolymer comprise a monomer which is present in a predominant amount, then long sequences of the predominant monomer must occur even in a random copolymer for the polymer to be thermoplastic. Examples of such polymers are random ethylene/propylene copolymers having in excess of about 85-90 mole percent ethylene which have percent crystallinities over 35 percent and are non-rubbery [F. P. Baldwin and G. Ver Strate, Rubber Chem. and Technol., 45, 709 (1972)].

The non-rubbery thermoplastic polyolefin of the present invention may be a random copolymer or terpolymer relying for its non-rubbery properties on its composition. In this case, the composition will lie within the most preferred range as specified above. i.e., a 1-alkene, present at a level of 90 to 99.9 mole percent, an optional second 1-alkene, present at a level of 0 to 9.9 mole percent, a non-conjugated diene, present at a level of 10 to 0.1 mole percent.

Such random copolymers and terpolymers can be prepared by reaction of the component monomers, 1-alkene, diene and optionally second alkene in the presence of a Ziegler-Natta type catalyst in a conventional back mixed reactor, in the gas or the liquid phase.

Of these random copolymers and terpolymers, ethylene/diene and propylene/diene copolymers are preferred. For such preferred copolymers, their density may be used as a convenient measure of non-rubbery properties. For ethylene/diene copolymers, densities above 0.900 g/cc and for propylene/diene copolymers, densities above 0.890 g/cc indicate non-rubbery properties, while those below these values indicate rubbery properties. Methods for preparing such preferred copolymers have been described by S. Kitagawa and I. Okada in U.S. Pat. No. 4,366,296, the teachings of which are hereby incorporated by reference. The non-rubbery thermoplastic polyolefin component of the present invention may be a non-random copolymer or terpolymer whose non-rubbery properties are derived from its orderliness rather than from its composition. Japan Kokai J.P. No. 59155416 (assigned to Mitsubishi Petrochemical KK) describes the preparation of propylene/ethylene/1,4-hexadiene terpolymers with block structure which are examples of suitable non-random terpolymers for use as non-rubbery thermoplastic polyolefin component.

The N-Halothiosulfonamide Component

Suitable N-halothiosulfonamides for use in the present invention include compounds of the general formula:

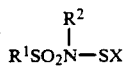
$$R^1SO_2N-SX$$
(with $R^2$ on the N)

where X is chlorine or bromine, preferably chlorine (N-chlorothio-sulfonamide), where $R^1$ and $R^2$ are selected from the group consisting of alkyl radicals having 1–20 carbon atoms, aralkyl radicals having 7–20 carbon atoms, alkaryl radicals having from 7–20 carbon atoms, and aryl and substituted aryl, e.g., haloaryl, radicals having 6–10 carbon atoms and where $R^1$ is also selected from radicals having the formula:

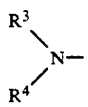
$$\begin{array}{c} R^3 \\ \phantom{R}\diagdown \\ \phantom{RR}N- \\ \phantom{R}\diagup \\ R^4 \end{array}$$

where $R^3$ and $R^4$ are individually selected from said alkyl, aralkyl, and aryl and substituted aryl, e.g., haloaryl, radicals and where $R^3$ and $R^4$ can be joined together to represent radicals selected from $-(CH_2)-n$, where n is an integer of 4 to 7, and $(CH_2)_2-O-(CH_2)_2-$.

In the practice of this invention, for the N-chlorothiosulfonamide, $R^1$ and $R^2$ are preferably selected from alkyl radicals having 1 to 6 carbon atoms, phenyl radicals, monoalkyl substituted phenyl radicals having from 7 to 10 carbon atoms and dialkylsubstituted phenyl radicals having from 8 to 11 carbon atoms where such alkyl substituent or substituents are radicals selected from the group consisting of methyl, ethyl, and all isomeric forms of propyl and butyl radicals, and from the p-chlorophenyl radical.

Representative of radicals suitable for $R^1$ are radicals selected from methyl, tert butyl, cyclohexyl, 2-eicosyl, benzyl, 2-(p-n-undecylphenyl)-2-propyl, phenyl, 1-naphthyl, p-tolyl, 3-ethyl-4-(n-dodecyl)phenyl, p-chlorophenyl and 3-chloro-4-(n-butyl)phenyl radicals.

Representative of radicals suitable for $R^2$ are methyl, tert butyl, 1-eicosyl, cyclohexyl benzyl, 1-(p-n-dodecylphenyl)-1-ethyl, phenyl, 1-naphthyl, m-tolyl, 3,4-di-(n-heptyl)phenyl, p-bromophenyl and 3-chloro-4-(n-butyl)phenyl radicals.

Representative examples of N-chlorothio-sulfonamides which can be used in the present invention are
N-chlorothio-N-methyl-methanesulfonamide,
N-chlorothio-N-methyl-benzenesulfonamide,
N-chlorothio-N-methyl-p-toluenesulfonamide,
N-chlorothio-N-ethyl-p-toluenesulfonamide,
N-chlorothio-N-methyl-ethanesulfonamide,
N-chlorothio-N-phenyl-p-toluenesulfonamide,
N-chlorothio-N-(2-propyl)-methanesulfonamide,
N-chlorothio-N-(1-propyl)-p-chlorobenzenesulfonamide,
N-chlorothio-N-phenyl-methanesulfonamide,
N-chlorothio-N,N',N'-trimethylsulfonamide,
N-chlorothio-N-methyl-N',N'-(pentamethylene)-sulfonamide,
N-chlorothio-N-methyl-N',N'-diethylsulfonamide, and
N-chlorothio-N-phenyl-benzenesulfonamide.

Chlorothiosulfonamides suitable for use in the admixture of the present invention, as well as their preparation, have further been described in the patent literature. For example, West German DPS No. 1,156,403 shows the preparation of chlorothio-sulfonamides by reaction of a sulfonamide with $SCl_2$ in the presence of an organic acid acceptor.

West German DPS No. 1,101,407 shows the preparation of chlorothiosulfonamides from N,N'-dithiobis(-sulfonamides) and chlorine or sulfuryl chloride. The chlorothiosulfonamides of the present invention can be prepared by analogous procedures.

The preferred amount of CTSA added depends on the specific nature of the low unsaturated (EPDM) polymer, the specific nature of the highly unsaturated polymer or polymers to be used in a blend of the two types of polymers, etc. The ratio, (moles CTSA)/(moles unsaturated sites in the polymer) can be from about 0.03/1 to about 1/1, but is preferably in the range of about 0.15/1 to about 0.8/1 and more preferably about 0.2/1 to about 0.7/1.

PREPARATION PROCESS

The modified non-rubbery thermoplastic polymer products of the invention are prepared by contacting a non-rubbery thermoplastic polyolefin polymer reactant with a N-halothiosulfonamide reactant, at reaction conditions, in a reaction zone. The reaction can be performed in the absence of a catalyst or in the presence of a catalyst, such as a Lewis Acid. Preferably a catalyst is used. A preferred catalyst for use in the preparation of the modified thermoplastic polyolefin products of the invention is a selective catalyst which comprises an effective amount of a salt of a weak acid. By the term "selective catalyst" is intended herein that the desired addition reaction is increased while the undesired crosslinking reaction, which leads to gelation, is minimized. The salt of the weak acid may be represented by the formula MAn, wherein M is a metal selected from the group consisting of copper, antimony, bismuth, tin, zinc, iron, and mixtures thereof. "A" is preferably an anion or mixture of anions of a weak acid and n is a number corresponding to the oxidation state of M divided by the valence of said weak acid anion. The Lewis acidity of a catalyst depends on the nature of the metal atom and the anions present. Overall Lewis acid acidity of the catalyst is reduced by the presence of anions of lower electronegativity, i.e., anions of weaker acids. This appears to at least partially reduce the reactivity of the less preferred metals and in consequence leads to higher selectivity. As an example, zinc carboxylates, such as zinc naphthenate, can be used under conditions where zinc halides, such as zinc chloride cannot. When the metal is less active toward the cross-linking reaction, anions derived from stronger acids can be tolerated. Other considerations in the choice of anions include the following: anions which are sterically hindered, such as naphthenates or 2-ethylhexanoates are preferred as are anions with substantial hydrocarbon chains, such as stearates. Furthermore, anions comprising substantial hydrocarbon chains are particularly preferred in bulk phase reactions because of their compatibility with or solubility in hydrocarbons, such as molten polymers.

Weak acids are commonly characterized by means of the reference "pKa." This term is a measure of the completeness of the dissociation of the acid, Ka being the equilibrium constant of the dissociation of the acid, and the value pKa being the negative of the logarithm (to the base 10); the weaker the acid, the larger its pKa value. It is commonly accepted that acetic acid is a weak acid, with a pKa value at (25° C.) of about 4.75. For the purposes of this invention, weak acids are those whose pKa are greater than about 4.0. Weak acids useful in the present invention include $C_4$ to $C_{20}$ saturated mono- or poly-carboxylic acids; in particular, a carboxylic acid selected from the group consisting of caproic, caprylic, lauric, stearic, 2-ethyl hexanoic, neodecanoic and naphthenic. Furthermore, the higher molecular weight carboxylic acid compounds are soluble in the polymer phase and are, therefore, more readily available for reaction, particularly when the reaction is carried out in the melt.

In carrying out the process of this invention, in the presence of a catalyst, the catalyst is suitably present in the reaction medium at a concentration of about 1,000 to about 1 parts per million (ppm) metal in the polymer; preferably about 100 to about 5; more preferably about 50 to about 5 ppm. The catalyst can be premixed with the polymer (particularly for a melt phase process) or CTSA (or both), or added as an independent stream to the reactor; a combination of additive methods can also be used.

The preferred catalysts are found to enhance the rate of the CTSA addition reaction, but do so to a lesser extent than the less preferred catalysts. Thus less preferred catalysts are more reactive but less selective and it is clear that to some extent reactivity and selectivity are inversely related. Less preferred catalysts are those based on metals which, although they are capable of effecting essentially quantitative conversion of CTSA, result in the formation of moderate gel in the polymer. This effect is particularly noticeable as the concentration of the catalyst is elevated and when used in a melt phase reaction. An example of such a catalyst metal is iron, and it is useful when present during reaction at concentrations of less than about 75 ppm based on the polymer, preferably at a concentration of about 1 to about 50 ppm, more preferably about 5 to about 25 ppm.

Still less preferred, but useful, are catalysts based on metals which result in gel at still lower levels of metal concentration in the polymer when the reaction is conducted in the melt phase. Examples of such metals include zinc, particularly in the form of a salt of a weak acid, which acids have been defined hereinabove. The use of such a metal catalyst is useful at concentrations of less than about 50 ppm, preferably such a catalyst is used at about 1 to about 40 ppm, more preferably about 1 to about 10 ppm. However, the use of iron and zinc as metal components of the catalyst can be accomplished in a dilute solution process with suitable control to limit reaction time; for example, it is preferred that the reaction under such conditions be less than about 1 hour at about 100° C. In view of the teachings herein in combination with principles of reaction kinetics, one skilled in the art can make appropriate time/temperature adjustments.

Clearly, mixtures of useful catalysts of the type defined herein are also useful for producing the desired product.

Whether the preparation is conducted in the presence of a catalyst or in the absence of a catalyst, a sufficient amount of the N-halothiosulfonamide is used to contact and react with the non-rubbery thermoplastic polyolefin polymer to produce a modified thermoplastic polyolefin product comprising in its structure from about 0.1 to about 10 mole percent, preferably from about 0.1 to about 5 mole percent, more preferably from about 0.1 to about 3 mole percent of said N-halothiosulfonamide. For example, the N-halothiosulfonamide reactant is introduced into the reaction zone in an amount one to three times the amount of CTSA that is desired to be in the modified thermoplastic polyolefin product. The reaction of the N-halothiosulfonamide and the non-rubbery thermoplastic polyolefin may be performed in a solution, in a swelling method, that is, swelling a solution of CTSA into the non-rubbery thermoplastic polyolefin or in a melt phase reaction. Preferably, the reaction is performed in a melt phase, at a temperature ranging from about 40° to 170° C., preferably 50° to 150° C., more preferably 60° to 130° C., and at a residence time ranging from about 0.1 to 10 minutes, preferably from about 0.5 to 5 minutes, more preferably from about 1 to 3 minutes.

Reaction of the CTSA with the non-rubbery thermoplastic polyolefin can be achieved using both solution and melt phase (or neat) processes. One method involves addition of the chlorothiosulfonamide to a solution of the polymer in an inert organic solvent such as heptane, hexane, cyclohexane, methyl cyclohexane, chloroform, benzene or toluene. As taught in U.S. Pat. No. 3,970,133 more polar solvents are preferred. The reference teaches that they increase the rate of formation of polymer bound adduct; for example, adduct formation occurs much more rapidly in chloroform as a solvent than in hexane. The reference states that a mixture of nonpolar solvent with a highly polar solvent may be used advantageously; for example, a mixture of 40 volumes of hexane and 1 volume of acetic acid can produce substantially faster adduct formation as compared to hexane alone. However, the rate of substantially gel free adduct formation can be markedly improved by catalysis with metal salts of weak acids such as copper, antimony, bismuth, tin, zinc, iron and mixtures thereof; for example, copper (II)naphthenate.

Another method comprises directly blending the CTSA with the polymer by mixing means such as an internal mixer (Banbury ®, Brabender ® or extruder type). For direct mixing, it is advantageous to suspend or dissolve the CTSA in a relatively inert medium such as mineral oil or chlorinated paraffin in order to improve dispersion as well as minimize hydrolysis by atmospheric moisture. It is particularly important that the reaction be carried out using reactants (polymer, CTSA) and diluents, if any, which have been thoroughly and uniformly dried to avoid erratic reactivity and/or the formation of undesirable by-products due to hydrolysis of CTSA and the formation of $SO_2$, HCl and elemental sulfur. In the most preferred procedure all traces of moisture are removed. As a practical matter in view of large scale production and handling, it is preferred that polymer moisture be less than about 0.1 weight percent, more preferably less than about 0.05 weight percent, most preferably less than about 0.02 weight percent.

The reaction is preferably carried out at the lowest temperature commensurate with the extent of reaction desired and in view of reasonable reaction times as well as polymer processing/flow and polymer degradation, particularly when the reaction is conducted in the melt. Solution reaction can be carried out at from about 10° C. to about 125° C., preferably about 20° C. to about 80° C., with ambient temperature being convenient and practical. Reactions conducted in the melt phase are preferably carried out at about 40° C. to about 170° C.; more preferably about 50° C. to about 150° C.; most preferably about 60° C. to about 130° C.

Melt phase reactions are preferably carried out in equipment and in processes as taught in U.S. Pat. No(s). 4,513,116; 4,548,995; 4,554,326 and 4,563,506 incorporated herein by reference and adapted to the specific requirements of the reaction and reactants herein. These references describe reaction of polymers in a continuous flow device such as an extruder, for example, a twin screw extruder. In the present process a neat polymer, or one with a limited amount of diluent, is caused to react with the reagent, CTSA, to produce a useful product. For the purposes of this invention the terms melt phase and bulk phase are used interchangeably. Furthermore, it is to be understood that reference to the reaction of a neat polymer in the melt (or in a melt phase process) includes polymer with a limited amount of diluent. The use of a diluent is discussed below in conjunction with the feed zone of an extruder process for carrying out the invention.

The non-rubbery thermoplastic polyolefin polymer and CTSA are preferably contacted, or reacted, in the absence or in the presence of a catalyst in a continuous flow device. Suitable devices include kneaders, extruders (employing single or multiple screws, e.g., twin screws), continuous mixers and a blending/extrusion device referred to as a cavity transfer mixer (see, e.g., European Rubber Journal, July-August, 1982, pages 29-32 and G. M. Gale, U.K. Patent Application No. 8030586, 1980). Although the defined polymers can attain very high viscosities, even at relatively high temperatures, such devices are capable of sufficiently deforming such polymers to achieve the necessary degree of mixing and reaction.

The continuous flow device should be capable of initially forming the polymer feed into a cohesive mass and then deforming the polymer, disrupting the polymer surface, thereby exposing fresh, i.e., unreacted, polymer to the CTSA. The exposure of new surface does not necessarily require the use of high speeds where, e.g., an extruder is used. However, surface disrupting means are preferably employed, for example, pins, reverse flow sections, a "Maillefer" screw design, the cavities of a cavity transfer mixer, multiple flight screw section, interrupted flight sections, e.g., slotted flights, and combinations thereof. In this manner, efficient mixing and contact between the polymer and CTSA are achieved at the lowest temperature consistent with achieving the desired extent of reaction. As a consequence, undesirable polymer degradation is avoided as side reactions which may result in, e.g., crosslinking of the polymer.

CTSA is fed to the reaction zone, preferably by means of a separately controllable feed line. It is metered into the reaction zone so as to be present at the desired concentration, taking into consideration the polymer feed rate. Typically, feed rates (based on 100 kg per hour of polymer) of about 1 to 3 weight % are useful, preferably about 1.5 to about 2 weight %. Temperature is controlled in the range of about 25° C. to about 130° C. so that the CTSA is preferably in a liquid state to facilitate feed control and mixing. Particularly useful CTSA has a melting point of about 20°-30° C. at ambient pressure, so that they can be readily handled as a liquid at moderately elevated temperature.

The catalyst can be fed to the reaction zone by various convenient means: it can be predispersed at the desired concentration in the polymer or the CTSA or both; it can also be introduced as a separate feed stream into the feed zone and/or the reaction zone. Preferably, the catalyst is introduced by blending it with the polymer prior to introducing the CTSA into the continuous flow device.

When the region in which the polymer and CTSA are brought into contact, e.g., the reaction zone of an extruder, is not completely filled with polymer, the CTSA and the polymer are present as either discontinuous or continuous phases; a discontinuous polymer phase is preferred. A preferred operating mode of the process utilizes a reaction zone which is only partially filled with polymer; this permits reaction by-products to disengage from the polymer phase and facilitates contact between CTSA and newly generated polymer surface. Generally, the polymer is present so that it fills the available volume of the reaction zone to the extent of about 5 to about 95%, preferably 10 to about 75%, more preferably about 15 to about 50%, for example, 20 to about 35% of the reaction zone.

One means of achieving a partially filled reaction zone is to feed, in a controlled manner, less polymer into the reaction zone than the conveying capacity of the zone. The space around the polymer is occupied in part by the CTSA and, as fresh surface is exposed to the CTSA reaction occurs. In a preferred embodiment, utilization of vent means at a downstream position in the reaction zone facilities removal of by-products.

Downstream of the reaction zone, vent means are provided to remove unwanted and undesirable reaction by-products, including HCl and $SO_2$, in the event any are formed by hydrolysis of CTSA due to, for example, the presence of moisture in the system. In a preferred embodiment, disengagement is achieved by injection of an inert gas, e.g., nitrogen, argon, carbon dioxide or dry air into said continuous flow device. The injection point or points for the inert gas may be downstream and/or upstream of the vent means. In another preferred embodiment, disengagement is made more efficient by imposing a vacuum on the vent means. The vent means may comprise one or more separate venting sections. In the case of multiple venting sections, it is preferable to provide appropriate screw elements between the vents to form a polymer seal between the individual venting sections.

Rapid and complete disengagement is effected by employing process features such as those described earlier with regard to reaction in order to achieve polymer deformation and surface disruption so as to expose fresh polymer surface to the inert gas. In a preferred embodiment, disengagement occurs in a region of the continuous flow device which is not completely filled with polymer. In a still more preferred embodiment, vent means are provided so that the inert gas and by-products are removed from the polymer conveying means. The amount of inert gas employed can be readily determined and should be an amount effective for the disengagement without being unnecessarily wasteful; inert gas injection can be achieved using more than one injection port. Another option is a region for injecting a polymer stabilizer into the continuous flow device. In another embodiment, the inert gas injection and venting configuration is designed so as to permit explosive release of the injected inert gas from the reacted polymer in order to facilitate in the removal of unwanted materials. Filter means can also be employed to remove undispersed material from the modified polymer.

Preferably the various zones which have been described are separated from one another in such a manner as to permit maximum independent control of conditions in each zone. For example, a seal comprising polymer melt is formed between the feed section and reaction zone so as to avoid "blow back" of CTSA. A polymer melt seal may also be provided to allow separation between multiple vent zones. The means of achieving such a polymer melt seal are well known to those skilled in the art of polymer processing.

Details and conditions are described below for a preferred embodiment utilizing an extruder-reactor, but the principles disclosed are broadly applicable to the general process. It is to be understood that reference to the screw of an extruder is to include both single and multiple (e.g., twin) screw extruders, intermeshing and nonintermeshing as well as co- and counterrotating screws. The extruder-reactor may be thought of as carrying out the polymer modification in various operating zones:

DESCRIPTION OF THE PREFERRED EMBODIMENT (A) Feed Zone—in which polymer is introduced into the extruder-reactor in convenient form. This form includes, for example, particles and/or pellets of polymer which may be in stable form as produced in a polymer manufacturing plant, each of which is preferably free of reactive contaminants, e.g., moisture and reactive hydrocarbons.

The feed zone is designed to form the polymer feed into a cohesive mass and convey or pump the mass past a restrictive dam which follows the feed zone and distinguishes it from the reaction zone which follows. This operation should be conducted at low shear and temperature consistent with the desired result and at a pressure sufficient to convey the mass, typically up to about 600 psig, preferably up to about 400 psig, most preferably up to about 200 psig. Lower pressures and shearing forces are preferred. This can be achieved, e.g., by utilizing extruder screws with relatively deep flights and by keeping the length, as short as possible commensurate with desired production rates. For example, polymer can be introduced at about room temperature and exit from the feed zone at about 40° to 150° C.

A restrictive dam is used to separate the feed zone from the reaction zone which follows it so as to prevent back leakage of reactants. This dam is not restrictive enough, however, to cause excessive overheating of the polymer. A restrictive dam can be, for example, a reverse flighted screw section, a filled screw section (also referred to as a compounder), a shallow flighted screw section, an unflighted screw section, combinations thereof, or other means known in the art. An unflighted screw section is preferred, and it can have a larger diameter than the root diameter upstream of it, for example 5-25% larger, but not greater than the screw flight diameter. If a reverse flighted screw section is employed it can be single or multi-flighted, preferably multi-flighted.

In addition to the polymer which is introduced into the feed zone, an optional diluent may also be added. A diluent can function to reduce the viscosity of the polymer to a level commensurate with subsequent good mixing and reaction without the necessity for excessive heat generation and a risk of molecular weight breakdown and undesirable side reactions. The diluent may be volatile saturated hydrocarbon, chlorohydrocarbon or chlorocarbn such as pentane, hexane, methylene chloride, chloroform, or carbon tetrachloride. It may also be a non-hydrocarbon, readily removable from the system downstream, but able to perform the function of temporarily reducing the apparent viscosity of the polymer in the reaction zone. Examples of suitable materials include inert gases such as nitrogen and argon, as well as gases such as carbon dioxide and air.

The total amount of diluent, including that which may be present in the feed should not be greater than about 50 wt. % based on the polymer, preferably less than about 15 wt. %, most preferably about 5 to about 10 wt. %.

As discussed hereinabove, catalyst can be blended with the polymer prior to the polymer being fed to the extruder and/or it can be added as a separate feed stream. If as a separate stream, it is preferred that the catalyst be dispersed or dissolved in a carrier diluent to facilitate flow control. Suitable diluents include mineral oil and hydrocarbon, diluents inert to the reaction, for example, halogenated hydrocarbons.

(B) action Zone—can generally be described as the zone in which the CTSA is caused to react with the polymer to effect the grafting reaction while simultaneously minimizing undesired side reactions. Screw configuration in the reaction zone is important to mixing efficiency and achievement of the overall objectives of the process. The configuration should be such as to cause disruption and reorientation of the flow of polymer, as, for example, by the aforementioned use of reverse flights, multiple reverse flights, pin sections, a series of very short alternating reverse and forward screw sections, multiple flight, interrupted flight sections and combinations thereof, and other designs known in the art to improve mixing. Viscosity control of the polymer, effected, in part, by the use of an optional diluent and by control of the molecular weight of the polymer and the polymer temperature as it enters the reaction zone, also determines, to a large extent, deformability. Selection of the temperature level influences the reaction and, along with residence time in the reaction zone, the nature of the end product.

Control is required in order to optimize residence time and avoid polymer degradation and gelation. This can be achieved by, for example, controlling the CTSA feed rate in comparison to the polymer feed rate, design of the reaction zone (length, screw features and configuration, injection means, temperature, etc.) and RPM so as to determine time of reaction and to control the relative rates of the desired reaction versus competing side reactions and gelation.

The CTSA can be gaseous, liquid or solid and may be added either in a pure state or diluted with a suitable inert fluid. In this process, alternative reaction zone mixing techniques are feasible. Injecting CTSA at a point or points filled with polymer can be employed. Similarly the reaction is allowed to occur at the continuously renewing polymer surface generated by the configuration of the reaction zone and conveying means, e.g., the extruder screw and barrel, in a reaction zone partially filled with polymer. Configuration of the screw and chamber walls should not be so restrictive as to cause excessive pressure and excessive shear heating of the polymer. Pressure at the point of injection need not be very high where the reaction zone is only partially filled with polymer and preferably vented. In addition, injection can be into the space not occupied by the polymer. A moderately positive injection pressure is suitable; the pressure selected should maintain a positive flow into the reaction zone and prevent plugging of the line. The specific pressure chosen is a matter of operating convenience. Generally, pressure at the point of injection is about 15 to about 400 psig.

Also important for achieving efficient reaction of the polymer and CTSA is the incorporation in the reaction zone of means to produce the level of polymer mixing and surface disruption preferred for the practice of this invention. As described earlier, this can be achieved, for example, by utilizing reverse flights on the reaction zone portion of the extruder screw, pins, etc. Other means, useful in combination with equipment design features, include operation of the screw at a rotation rate (using, for example, a 2 inch diameter screw) of about 50 to about 600 RPM, preferably about 70 to about 400 RPM, most preferably about 90 to about 350 RPM.

Catalyst addition can also be accomplished in the reaction zone, although with more difficulty insofar as achieving satisfactory dispersion. In such circumstances, addition at a point near the feed zone is preferred in order to allow maximum opportunity for mixing. The discussion hereinabove relating to catalyst injection is also relevant at this point.

Overall, it is desirable, by control of polymer viscosity, chamber and screw design, screw RPM, and operating pressure, to prevent excessive temperatures in the reaction zone while maintaining a high level of mixing. It is desirable that a reaction temperature of less than about 170° C. be achieved, preferably about 40° C. to about 170° C., more preferably about 50° C. to about 150° C., most preferably about 60° C. to about 130° C.

(C) Sweep Zone—in which residual by-product $SO_2$ and HCl are swept out of the extruder to avoid corrosion of the equipment. Suitable means to effect removal of these materials is the injection of an inert gas into the extruder. This is effected by employing process features such as those just described with regard to the reaction zone in order to disrupt the polymer surface and continually expose new surface to the inert gas in the sweep zone. In a preferred embodiment, vent means are provided in this zone to permit the inert gas and disengaged materials to be swept out and immediately removed from the system. In a particularly preferred embodiment, the screw configuration in the region of the vent comprises a deep, single flighted screw with little or no mixing occurring in the vicinity of the vent in order to avoid restricting the exiting flow of inert gas and disengaged materials. In another preferred embodiment various additives and/or stabilizers are added to the polymer in the sweep zone. As discussed earlier, multiple injection sites can be used as well as a supplementary injection zone. In another embodiment, pressure in the system is controlled in order to explosively remove the unwanted products by maintaining pressure in the system up to the region of the vent where it is allowed to be rapidly reduced to ambient.

The sweep zone is designed so that the inert gas contacts the reaction products from the reaction zone as soon as possible after the grafting reaction. This is achieved when, e.g., a dam is used between the reaction and sweep zones, by having it as short as possible consistent with its functioning as a restrictive dam. The nature and configuration of various alternatives for the restrictive dam are described above for the dam between the feed and reaction zones. The injection port for the inert gas can be located as close as possible to the downstream end of the dam or the sweep gas can be injected so as to flow countercurrent to the flow of the grafted product mixture. Additionally, the sweep gas can first be injected into the reaction zone, downstream of CTSA introduction to effect the initial removal of by-products using the methods just described Polymer stabilizing agents can optionally be added in this zone. This can be done by incorporating the stabilizers at an injection point. Suitable stabilizers include those known in the art for stabilizing halogenated polymers.

(D) Exit Zone—preferably the extruder-reactor comprises a final exit zone (D) in which the temperature of the modified polymer product is adjusted for delivery therefrom at a temperature below about 170° C., more preferably below about 150° C. and most preferably below about 130° C., as a contribution to the stability of the polymer. Also in the exit zone, stabilizer(s) may initially be added to the swept polymer product if not added in the sweep zone, or additional stabilizer(s) can be added.

In addition to the extruder-reactor features just described, the process of this invention can also incorporate a system for recycling any organic diluent that may be added to the feed zone and/or included with the CTSA and, optionally, means for back-mixing the modified polymer to assure that the final packaged polymer is a homogeneous product.

Materials of construction in the feed zone, reaction zone and sweep zone are selected from those well known in the art to prevent or minimize reaction of the equipment with CTSA, $SO_2$ and HCl, in view of safety considerations as well as long equipment life.

The modified polymers of this invention can be processed in standard equipment used for each such polymers, such as internal mixers (e.g., Banbury ®), mills, extruders, etc.

The following examples are presented to illustrate the invention. Unless otherwise indicated, all parts and percentages herein are by weight.

The following examples were carried out using:

(i) a solution of copper naphthenate (77 percent) in mineral spirits (23 percent, having a copper content of about 8 percent), as the catalyst.

(ii) N-chlorothio-N-methylbenzenesulfonamide (abbreviated below as SA) as the N-halothiosulfonamide (polymer modifier).

(iii) one of the following non-rubbery thermoplastic polyolefins:

EHD, an ethylene/hexa-1,4-diene random copolymer with a diene content of about 1.1 mole percent (0.37 mmole/g), with a density of 0.942 g/cc.

PHD, propylene/hexa-1,4-diene random copolymer with a diene content of about 0.75 mole percent (0.18 mmole/g), with a density of 0.905 g/cc.

EXAMPLES 1 to 4

The quantities used in these Examples are shown in Table 1. The copolymer PHD was dissolved in refluxing toluene in a multinecked glass flask, fitted with an air driven stirrer, nitrogen inlet and outlet and a reflux condenser. The polymer modifier, SA, was added followed by the copper naphthenate catalyst and each was washed in with a little toluene. The mixture was refluxed with stirring under nitrogen for two hours.

The products were isolated by pouring the cooled reaction mixture into a large volume of acetone. The recovered precipitate was dried in air at room temperature overnight.

The products were characterized by $^1$H NMR spectroscopy and the results are summarized in Table 1, together with data for the feed polymer, PHD. The NMR measurement of hexadiene content was based on the area of the olefinic double bond resonance near 5.4 ppm. The SA content measurement was based on the area of the resonance at about 4.5 ppm due to the hydrogen atom on the chlorine bearing carbon atom in the adduct.

The infrared spectra of the products showed peaks characteristic of the SA. FIG. 1 shows the absorbance for one of these, at about 720 cm$^{-1}$, ratioed to that of a peak at about 895 cm$^{-1}$ due to the feed polymer.

TABLE 1

| EXAMPLE | PHD FEED | 1 | 2 | 3 | 4 |
|---|---|---|---|---|---|
| REACTIONS OF PHD | | | | | |
| TOLUENE (g) | | 300 | 300 | 300 | 300 |
| PHD (g) | | 15 | 15 | 15 | 15 |
| SA (g) | | 0.5 | 1.0 | 1.5 | 3.0 |
| COPPER NAPHTHENATE (g) | | 0.5 | 0.5 | 0.5 | 0.5 |
| PRODUCT DATA | | | | | |
| SA (mmole/g by NMR) | 0.00 | 0.07 | 0.10 | 0.12 | |
| OLEFIN (mmole/g by NMR) | 0.18 | 0.09 | 0.03 | 0.03 | |
| SA + OLEFIN (mmole/g) | 0.18 | 0.16 | 0.13 | 0.14 | |
| A(720)/A(895) IR ABSORBANCE RATIO | 0.00 | 1.06 | 1.80 | 2.36 | 2.40 |

Footnote:
Reactions of examples 1 to 4 were run under reflux for 2 hours.

COMPARATIVE EXAMPLE 5

This comparative Example was performed in the manner of Example 1, except that no copper naphthenate was added. The precipitated product showed no incorporation of SA by infrared spectroscopy. The limit of detectability was about 0.002 mmole/g. The product of this comparative example is not a product of the invention.

EXAMPLE 6

This Example was performed in the manner of Example 5, except that the solvent, toluene (b.p. 111° C.), was replaced by an equal weight of mixed xylenes (b.p. 137°-144° C.). As in Example 5, the reaction was carried out under reflux. The spectrum of the precipitated product showed small but significant peaks due to SA.

The absorbance ratio A(720)/A(895) was measured at 0.095. Referring to FIG. 1, this corresponds to an SA content of about 0.006 mmole/g. This shows that the adduction reaction of SA to PHD can take place without a catalyst, but that the reaction is very slow. Comparing the results with Example 5, it is necessary to increase the reaction temperature, in order to detect SA in the product.

EXAMPLES 7 to 10

These Examples were carried out in the manner of Examples 1 to 4, except that the feed polymer was EHD. The quantities and product data are shown in Table 2.

TABLE 2

| EXAMPLE | EHD FEED | 7 | 8 | 9 | 10 |
|---|---|---|---|---|---|
| REACTIONS OF EHD | | | | | |
| TOLUENE (g) | | 300 | 300 | 300 | 300 |
| EHD (g) | | 15 | 15 | 15 | 15 |
| SA (g) | | 0.5 | 1.5 | 2.0 | 3.0 |
| COPPER NAPHTHENATE (g) | | 0.5 | 0.5 | 0.5 | 0.5 |
| PRODUCT DATA | | | | | |
| SA (mmole/g by NMR) | 0.00 | | 0.21 | 0.22 | 0.30 |
| OLEFIN (mmole/g by NMR) | 0.37 | | 0.15 | 0.06 | 0.03 |
| SA + OLEFIN (mmole/g) | 0.37 | | 0.36 | 0.28 | 0.33 |
| A(820)/A(720) IR ABSORBANCE RATIO | 0.01 | 0.20 | 0.33 | 0.44 | 0.46 |
| A(970)/A(720) IR ABSORBANCE RATIO | 0.31 | 0.20 | 0.10 | 0.03 | 0.02 |

Footnote:
Reactions were run under reflux for 2 hours.

The presence of SA in the products was evident from their infrared spectra. The absorbance ratio A(820)/A(720) was monitored as an indicator of SA content (the 820 cm$^{-1}$ peak is due mainly to the SA, but the feed polymer has a small peak near this frequency, as indicated in Table 2; the 720 cm$^{-1}$ peak is due mainly to the feed polymer, but has a contribution from the SA). In the EHD case, the hexadiene olefin content of the polymer can be monitored using its characteristic peak at about 970 cm$^{-1}$ (this is not possible in the PHD case because of a strong peak at this frequency due to the propylene units in that polymer). The changes in absorbance ratios, as shown in Table 2 are consistent with the formation of the adduct. The products of examples 7 to 10 are products of the invention.

What is claimed is:

1. A process for preparing a modified polymer product, which comprises contacting, at reaction conditions,
   (a) a component comprising a non-rubbery thermoplastic polymer of (1) at least one 1-alkene containing from 2 to 16 carbon atoms, and (2) at least one nonconjugated diene containing from 6 to 16 carbon atoms, wherein said diene following incorporation into said non-rubbery thermoplastic polymer does not include an olefinic carbon atom which has been fully substituted; said rubbery thermoplastic polymer having an initial tensile modulus ranging from about $10^0$ to about $10^3$ kilograms per square millimeter, and having an amount of crystallinity of at least about 35 weight percent; and
   (b) a N-halothiosulfonamide of the formula:

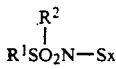

wherein x is bromine or chlorine and wherein $R^1$ and $R^2$ are selected from the group consisting of alkyl groups having from 1 to 20 carbon atoms, aralkyl groups having from 7 to 20 carbon atoms, and wherein $R^2$ is also selected from groups having the general formula;

wherein $R_3$ and $R_4$ are individually selected from said alkyl, aryl and substituted aryl groups and where $R^3$ and $R_4$ can be joined together to represent groups selected from the group consisting of —$(CH_2)_n$—, wherein n is an integer from 4 to 7 and —$(CH_2)_2$—O—$(CH_2)_2$—, said N-halothiosulfonamide being contacted in an amount sufficient to provide unsaid polymer product from about 0.1 to 10 mole percent of said N-halothiosulfonamide, and in the presence of a catalyst comprising an effective amount of a salt of a weak acid, said salt being represented by the formula $MA_n$ where A is a anion or mixture of anions of a weak acid, M is a metal selected from the group consisting of copper, antimony, bismuth, tin, zinc, iron, and mixtures thereof, and $_n$ is a number corresponding to the oxidation state of M divided by the valence of said anion.

2. The process of claim 1, wherein said (a) non-rubbery thermoplastic polymer comprises at least one additional 1-alkene.

3. The process of claim 1, wherein said (a) non-rubbery thermoplastic polymer comprises at least one additional non-conjugated diene.

4. The process of claim 1, wherein said N-halothiosulfonamide is contacted with said thermoplastic polyolefin in an amount sufficient to provide in said modified polymer product from about 0.1 to about 3 mole percent of said N-halosulfonamide, based on said modified polymer product.

5. The process of claim 1, wherein said process is conducted in the absence of a catalyst.

6. The process of claim 1, wherein said process is conducted in the presence of a catalyst.

7. The process of claim 1, wherein said contacting is performed in a solution or in a melt phase.

8. The process of claim 1, wherein said contacting is performed in the melt phase and wherein said reaction conditions include a temperature ranging from about 60° to 130° C. and a residence time ranging from about 1 to 3 minutes.

9. The process of claim 1, wherein said non-rubbery thermoplastic polymer is a copolymer of ethylene and a non-conjugated diene selected from the groups consisting of 1,4-hexadiene and dicyclopentadiene, the mole ratio of said ethylene to said non-conjugated diene ranging from about 99.9:1 to about 99:1.

10. The process of claim 1, wherein said non-rubbery thermoplastic polyolefin is a copolymer of a 1-alkene selected from the group consisting of propylene; 1-butene; 1-pentene; 4-methyl-1-pentene; 1-dodecene; said non-conjugated diene being selected from the group consisting of 1,4-hexadiene, and dicyclopentadiene; the mole ratio of said 1-alkene to said diene ranging from about 99.9 to 9:1.

11. The process of claim 1, wherein said non-rubbery thermoplastic polyolefin is a terpolymer and wherein said 1-alkene is selected from the group consisting of propylene; 1-butene; 1-pentene; 4 methyl-1-pentene; 1-dodecene; and wherein said non-conjugated diene is selected from the group consisting of 1,4-hexadiene and dicyclopentadiene; the combined mole ratio of said 1-alkenes and to said diene ranging from 99.1:1 to 9:1.

12. The process of claim 1, wherein said non-rubbery thermoplastic polymer is selected from the group consisting of an ethylene-1,4-hexadiene copolymer, a propylene-1,4-hexadiene copolymer, and an ethylene-propylene-1,4-hexadiene terpolymer.

13. The process of claim 1, wherein $R^1$ and $R^2$ of said N-halothiosulfonamide are selected from the group consisting of alkyl groups having 1 to 6 carbon atoms, phenyl groups having 7 to 10 carbon atoms and dialkyl substituted phenyl groups having 8 to 11 carbon atoms, and wherein said alkyl substituents are selected from the group consisting of methyl, ethyl, and all isomeric forms of propyl and butyl radicals, and from the p-chlorophenyl radical, and wherein X is chlorine.

14. The process of claim 1, wherein $R^1$ and $R^2$ of said N-halothiosulfonamide are selected from the group consisting of methyl, tert-butyl, cyclohexyl, 2-eiconyl, benzyl, 2-(p-n-undecyl-phenyl-2-propyl, phenyl, 1-naphthyl, p-butyl, 3-ethyl-4-(n-dodecyl) phenyl, p-chorophenyl and 3-chloro-4-(n-butyl) phenyl groups and $R^2$ is selected from the group consisting of methyl; tert-butyl; 1-eiconyl; cyclohexyl; benzyl; 1-(p-n-dodecylphenyl)-1-ethyl; phenyl; 1-naphthyl; n-tolyl; 3,4-di-(n-heptyl)-phenyl; p-bromophenyl, and 3-chloro-4-(n-butyl)-phenyl groups.

15. The process of claim 1, wherein said N-halothiosulfonamide is selected from the group consisting N-chlorothio-N-methyl-methanesulfonamide, N-chlorothio-N-methyl-benzenesulfonamide, N-chlorothio-N-methyl-p-toluenesulfonamide, N-chlorothio-N-ethyl-p-toluenesulfonamide, N-chlorothio-N-methyl-ethanesulfonamide, N-chlorothio-N-phenyl-p-toluenesulfonamide, N-chlorothio-N-(2-propyl)-methanesulfonamide, N-chlorothio-N-(1-propyl)-p-chlorobenzenesulfonamide, N-chlorothio-N-phenyl-methanesulfonamide, N-chlorothio-N,N',N'-trimethylsulfonamide, N-chlorothio-N-methyl-N',N'-(pentamethylene)-sulfonamide, N-chlorothio-N-methyl-N',N'-diethylsulfonamide, and N-chlorothio-N-phenyl-benzenesulfonamide.

16. The process of claim 1, wherein $R^1$ of said N-halothiosulfonamide is selected from the group consisting of methyl, phenyl and p-tolyl groups, and $R^2$ of said N-halothiosulfonamide is selected from the group consisting of methyl and phenyl groups and wherein X is chlorine.

17. The process of claim 1, wherein said N-halothiosulfonamide is N-chlorothio-N-methylbenzene-sulfonamide.

18. The process of claim 1, wherein M is selected from the group consisting of copper, antimony, bismuth, tin, and mixtures thereof.

19. The process of claim 1, wherein said anion is derived from a weak acid having a pKa value greater than about 4.0 at 25° C.

20. The process of claim 1, wherein said anion is derived from an acid selected from the group consisting of monocarboxylic acids and polycarboxylic acids having from 4 to 20 carbon atoms.

* * * * *